US010206135B2

United States Patent
Lee et al.

(10) Patent No.: US 10,206,135 B2
(45) Date of Patent: Feb. 12, 2019

(54) METHOD AND APPARATUS FOR HANDLING RAN ASSISTANCE INFORMATION FOR ROAMING USER EQUIPMENTS IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/117,037

(22) PCT Filed: Mar. 6, 2015

(86) PCT No.: PCT/KR2015/002177
§ 371 (c)(1),
(2) Date: Aug. 5, 2016

(87) PCT Pub. No.: WO2015/170823
PCT Pub. Date: Nov. 12, 2015

(65) Prior Publication Data
US 2017/0195908 A1 Jul. 6, 2017

Related U.S. Application Data

(60) Provisional application No. 61/952,892, filed on Mar. 14, 2014.

(51) Int. Cl.
*H04W 28/02* (2009.01)
*H04W 28/08* (2009.01)
(Continued)

(52) U.S. Cl.
CPC ........ *H04W 28/0231* (2013.01); *H04W 8/08* (2013.01); *H04W 28/0263* (2013.01);
(Continued)

(58) Field of Classification Search
CPC ..... H04W 84/12; H04W 88/06; H04W 48/16; H04W 48/18; H04W 84/042;
(Continued)

(56) References Cited

U.S. PATENT DOCUMENTS

2012/0307736 A1* 12/2012 Tang .................... H04W 28/08
370/328
2013/0102356 A1 4/2013 Shaw
(Continued)

FOREIGN PATENT DOCUMENTS

CN 102244899 A 11/2011
GB 2512347 A * 10/2014 ............ H04W 36/22
(Continued)

OTHER PUBLICATIONS

CATT, "RAN Assistance Information and Transmission Mechanism", R2-140079, 3GPP TSG RAN WG2 Meeting #85, Prague, Czech Republic, Feb. 10-14, 2014. http://www.3gpp.org/ftp/tsg_ran/WG2_RL2/TSGR2_85/docs/, see section 2.
(Continued)

*Primary Examiner* — Magdi Elhag
(74) *Attorney, Agent, or Firm* — Birch, Stewart, Kolasch & Birch, LLP

(57) ABSTRACT

A method and apparatus for handling radio access network (RAN) assistance information in a wireless communication system is provided. A user equipment (UE) receives first RAN assistance information for a roaming UE and second RAN assistance information for a nonroaming UE. According to whether the UE is the roaming UE or the non-roaming UE, the UE applies one of the first RAN assistance infor-
(Continued)

mation or the second RAN assistance information. If the UE is the roaming UE, the UE applies the first RAN assistance information, and if the UE is the non-roaming UE, the UE applies the second RAN assistance information.

15 Claims, 6 Drawing Sheets

(51) Int. Cl.
  *H04W 8/08* (2009.01)
  *H04W 84/04* (2009.01)
  *H04W 84/12* (2009.01)
  *H04W 88/06* (2009.01)
  *H04W 8/02* (2009.01)
(52) U.S. Cl.
  CPC ......... *H04W 28/08* (2013.01); *H04W 28/085* (2013.01); *H04W 84/045* (2013.01); *H04W 84/12* (2013.01); *H04W 88/06* (2013.01); *H04W 8/02* (2013.01)
(58) Field of Classification Search
  CPC ............. H04W 36/14; H04W 28/0284; H04W 28/0289; H04W 28/06; H04W 28/12; H04W 36/0022; H04W 36/04; H04W 36/08; H04W 36/165; H04W 40/246; H04W 48/08; H04W 8/02; H04W 8/08; H04W 8/14; H04W 28/0231
  See application file for complete search history.

(56) References Cited

U.S. PATENT DOCUMENTS

| 2014/0045493 | A1  | 2/2014  | Hapsari et al. | |
| 2014/0064068 | A1* | 3/2014  | Horn | H04W 28/0289 |
| | | | | 370/230 |
| 2014/0295843 | A1* | 10/2014 | Van Der Velde | H04W 36/22 |
| | | | | 455/436 |
| 2015/0003253 | A1* | 1/2015  | Wolfner | H04W 28/08 |
| | | | | 370/237 |
| 2015/0092553 | A1* | 4/2015  | Sirotkin | H04W 48/16 |
| | | | | 370/235 |
| 2015/0139186 | A1  | 5/2015  | Kim et al. | |
| 2018/0027469 | A1* | 1/2018  | Fukuta | H04W 36/14 |

FOREIGN PATENT DOCUMENTS

| WO | WO 2013/020519 A1 | 2/2013 |
| WO | WO 2013/180477 A1 | 12/2013 |

OTHER PUBLICATIONS

KDDI Corporation et al., "RAN assistance parameters for access network selection/traffic steering", R2-140415, 3GPP TSG RAN WG2 Meeting #85, Prague, Czech Republic, Feb. 10-14, 2014. http://www.3gpp.org/ftp/tsg_ran/WG2_RL2/TSGR2_85/docs/, see section 2.

LG Electronics Inc., "Ran Rule in Roaming," 3GPP TSG-RAN2 Meeting #85, R2-140784, Prague, Czech Republic, Feb. 10-14, 2014, p. 1.

* cited by examiner

[Fig. 1]
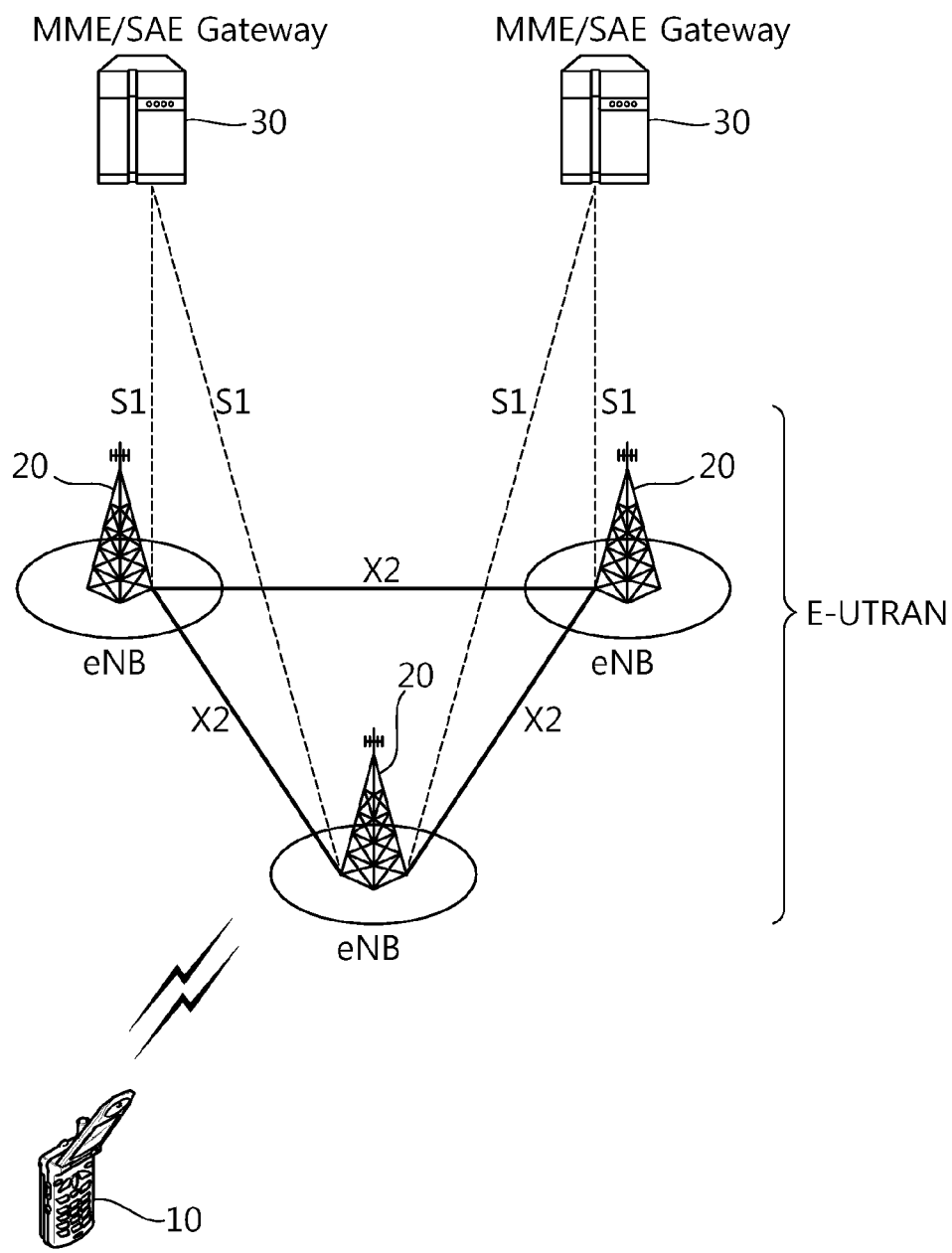

[Fig. 2]
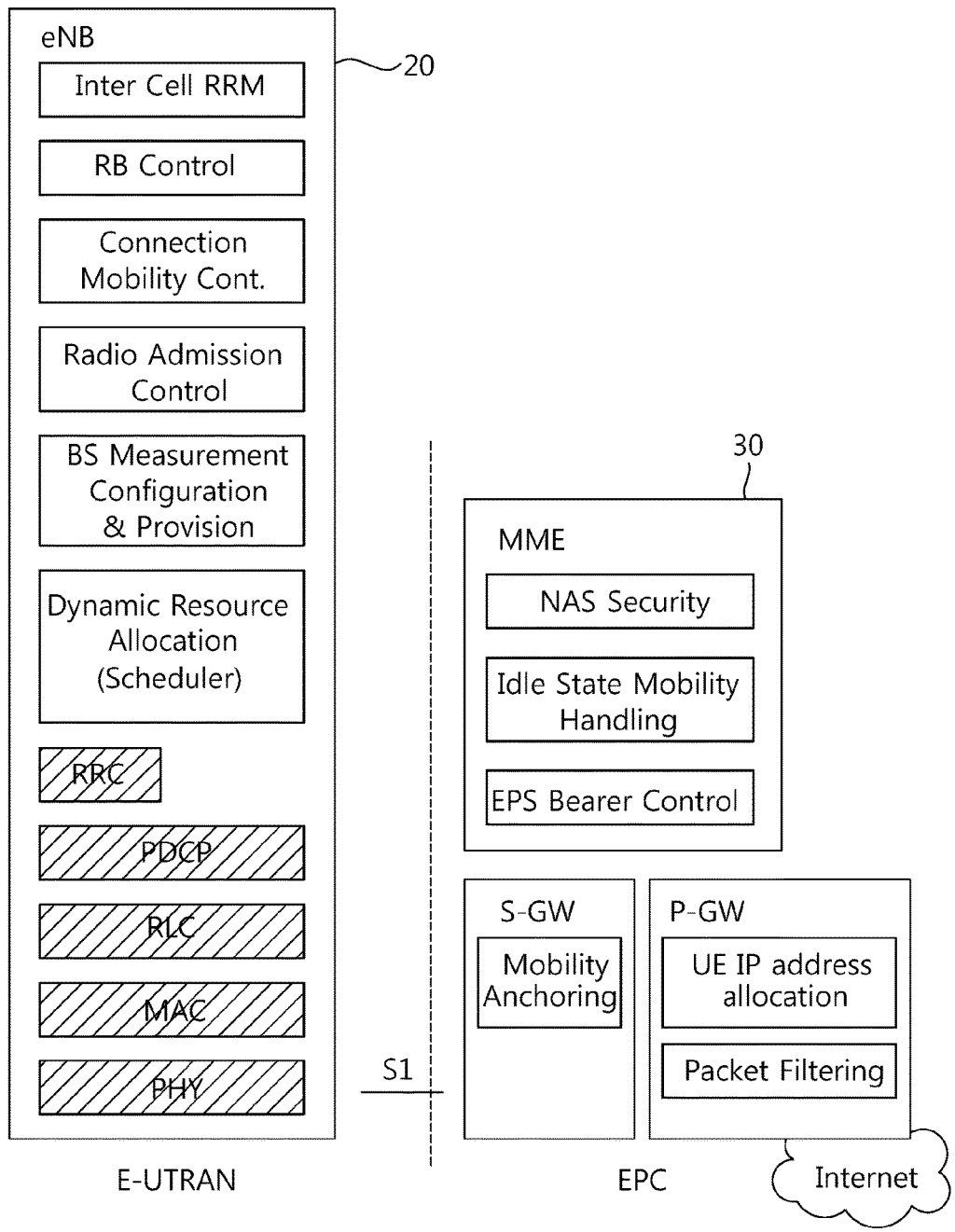

[Fig. 3]
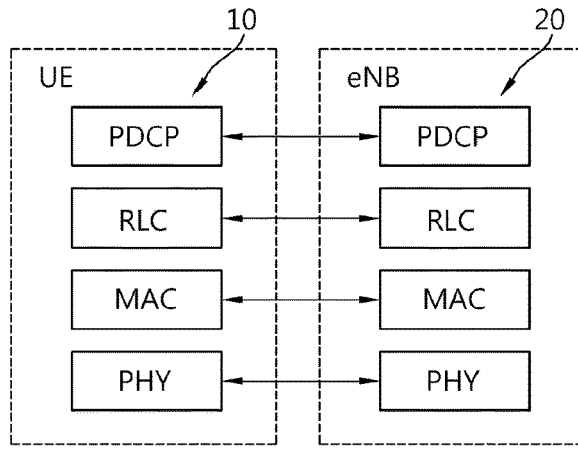
[Fig. 4]
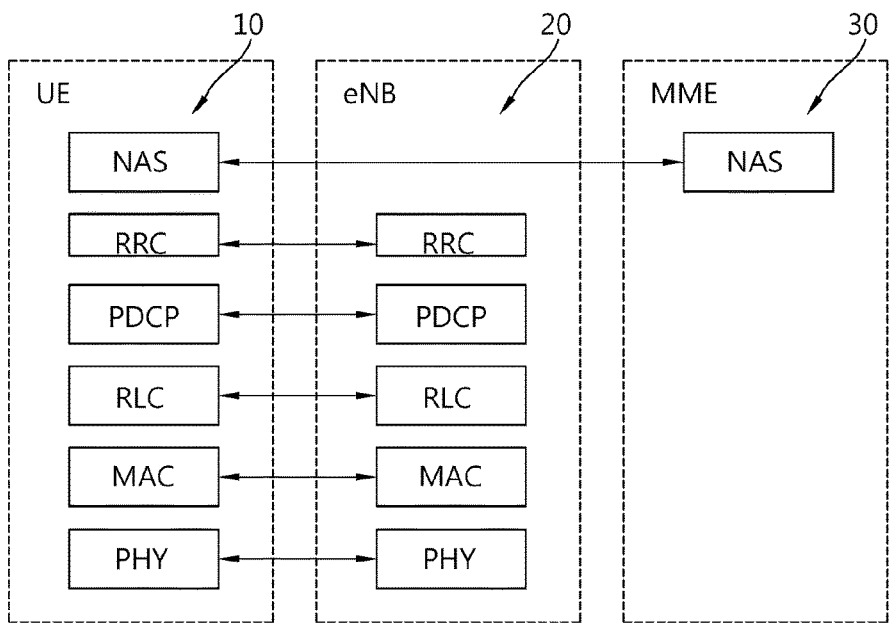
[Fig. 5]
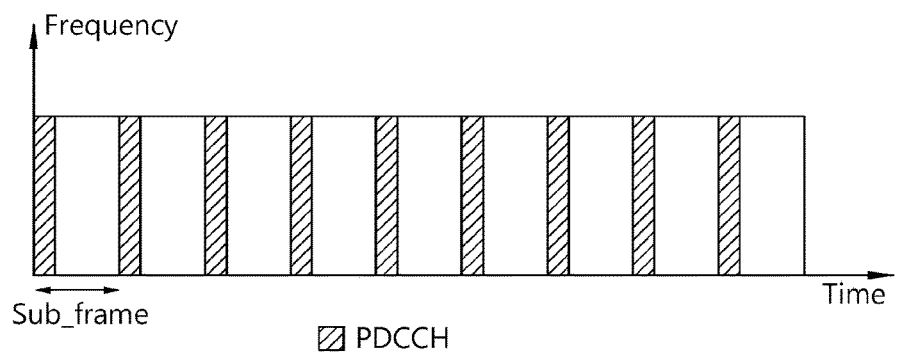

[Fig. 6]
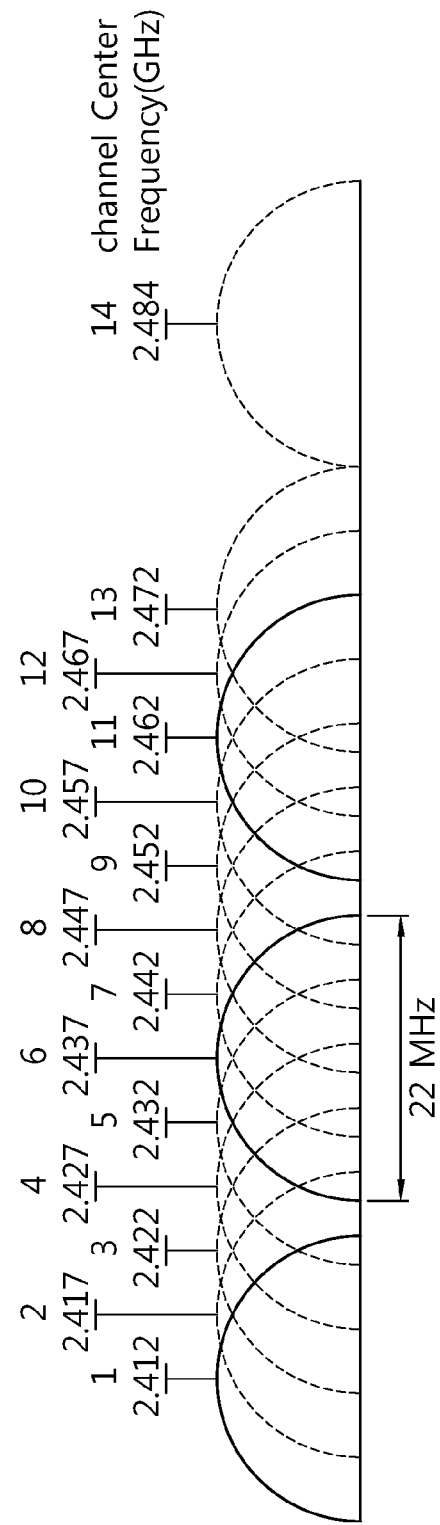

[Fig. 7]
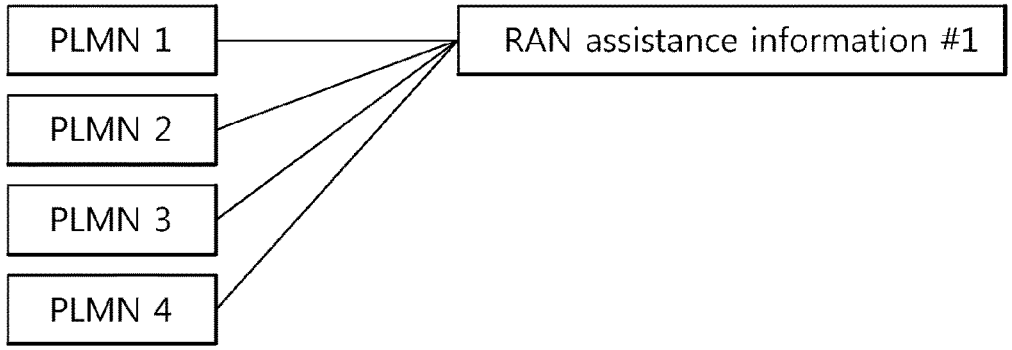
[Fig. 8]
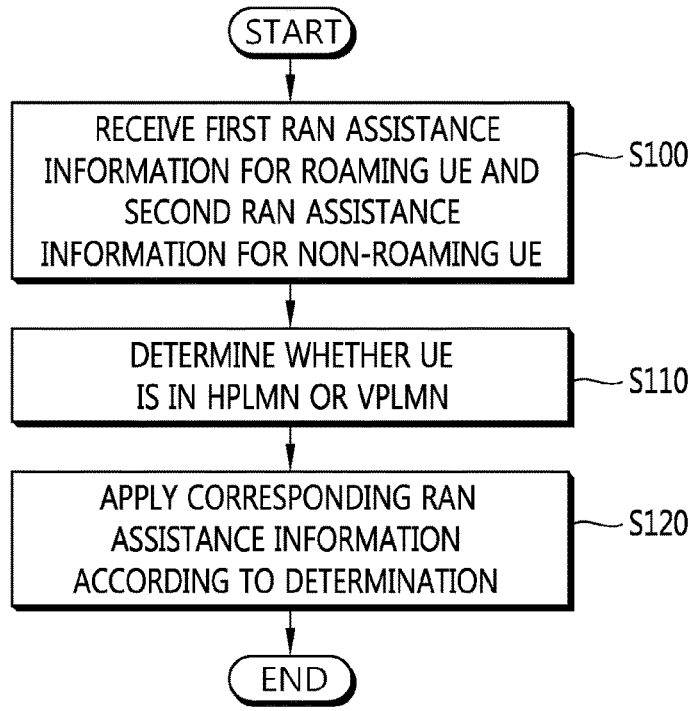
[Fig. 9]
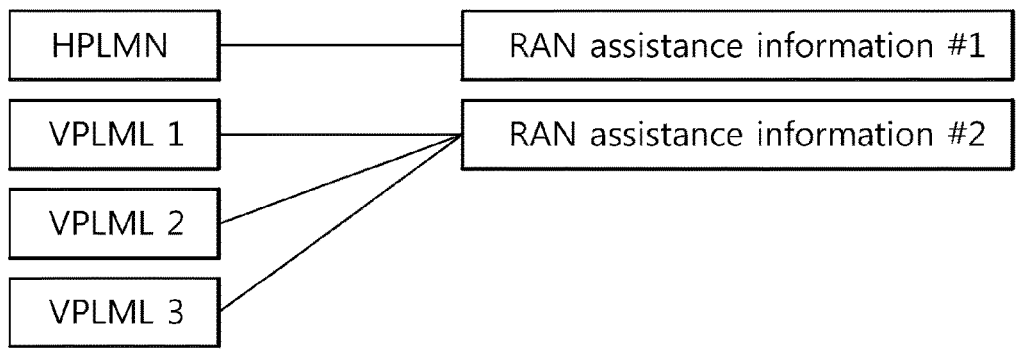

[Fig. 10]
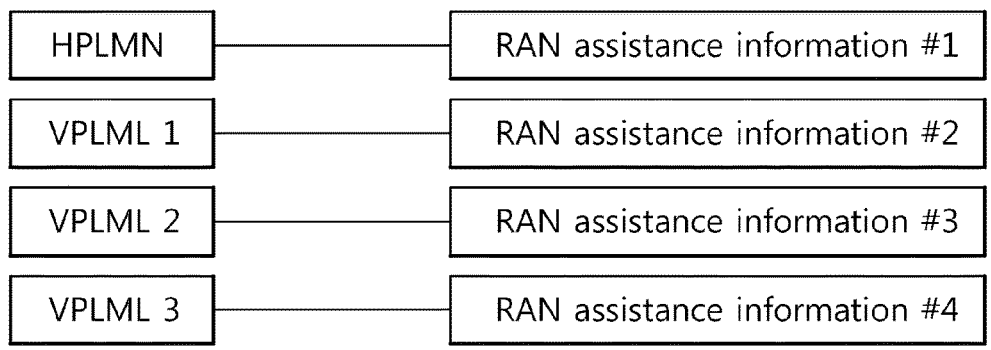
[Fig. 11]
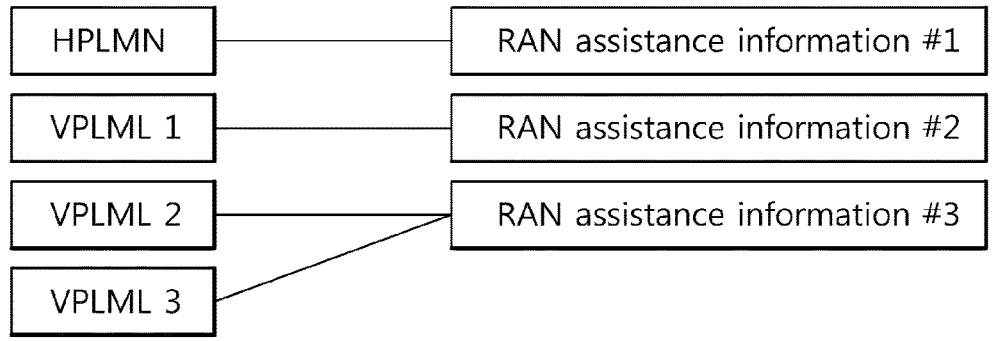
[Fig. 12]
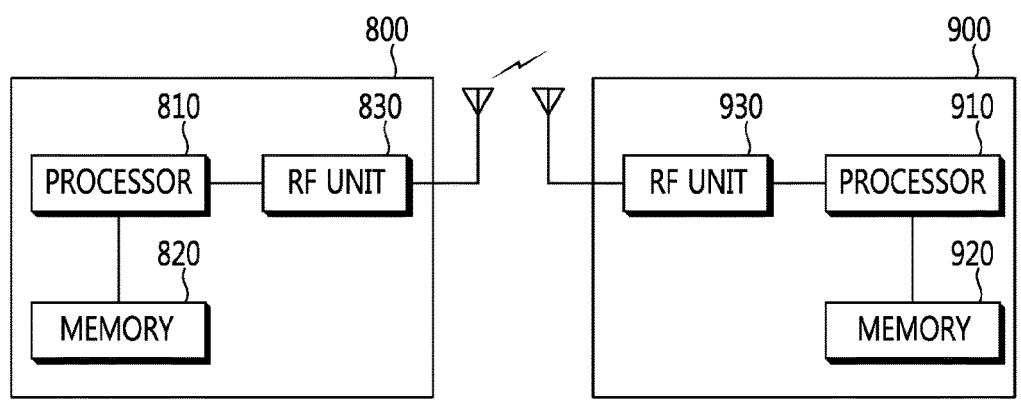

METHOD AND APPARATUS FOR HANDLING RAN ASSISTANCE INFORMATION FOR ROAMING USER EQUIPMENTS IN WIRELESS COMMUNICATION SYSTEM

CROSS REFERENCE TO RELATED APPLICATIONS:

This application is the National Phase of PCT International Application No. PCT/KR2015/002177, filed on Mar. 6, 2015, which claims priority under 37 U.S.C. 119(e) to U.S. Provisional Application No. 61/952,892, filed on Mar. 14, 2014, all of which are hereby expressly incorporated by reference into the present application.

TECHNICAL FIELD

The present invention relates to wireless communications, and more particularly, to a method and apparatus for handling radio access network (RAN) assistance information for roaming user equipments (UEs) in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc.), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the evolved packet core (EPC) as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

For efficient traffic steering between 3GPP/WLAN, radio access network (RAN) assistance information may be provided by the network. For the RAN assistance information, whether the UE is a roaming UE or non-roaming UE may need to be considered.

SUMMARY OF INVENTION

Technical Problem

The present invention provides a method and apparatus for handling radio access network (RAN) assistance information for roaming user equipments (UEs) in a wireless communication system. The present invention provides a method for receiving RAN assistance information for roaming UEs and RAN assistance information for non-roaming UEs, and applying the corresponding RAN assistance information.

Solution to Problem

In an aspect, a method for handling, by a user equipment (UE), radio access network (RAN) assistance information in a wireless communication system is provided. The method includes receiving, by the UE, first RAN assistance information for a roaming UE and second RAN assistance information for a non-roaming UE, determining, by the UE, whether the UE is the roaming UE or the non-roaming UE, and applying, by the UE, one of the first RAN assistance information or second RAN assistance information according to the determination.

In another aspect, a user equipment (UE) configured to handle radio access network (RAN) assistance information in a wireless communication system is provided. The UE includes a radio frequency (RF) unit configured to transmit or receive a radio signal, and a processor coupled to the RF unit, and configured to receive first RAN assistance information for a roaming UE and second RAN assistance information for a non-roaming UE, determine whether the UE is the roaming UE or the non-roaming UE, and apply one of the first RAN assistance information or second RAN assistance information according to the determination.

Advantageous Effects of Invention

For roaming UEs, traffic steering between 3rd generation partnership project (3GPP) long-term evolution (LTE) and wireless local area network (WLAN) can be performed efficiently.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows a graphical representation of Wi-Fi channels in 2.4 GHz band.
FIG. 7 shows an example of a method for providing RAN assistance information for roaming UEs.
FIG. 8 shows an example of a method for handling RAN assistance information according to an embodiment of the present invention.
FIG. 9 shows an example of configuration of RAN assistance information according to an embodiment of the present invention.
FIG. 10 shows another example of configuration of RAN assistance information according to an embodiment of the present invention.
FIG. 11 shows another example of configuration of RAN assistance information according to an embodiment of the present invention.
FIG. 12 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz industry-science-medical (ISM) band, operating in the United States under Part 15 of the US Federal Communications Commission (FCC) Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

FIG. 6 shows a graphical representation of Wi-Fi channels in 2.4 GHz band. 802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a 14th channel 12 MHz above channel 13 which was only allowed for 802.11b). 802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels—1, 5, 9 and 13. There are now four because the OFDM modulated 802.11g channels are 20 MHz wide.

In addition to specifying the channel centre frequency, 802.11 also specifies a spectral mask defining the permitted power distribution across each channel. The mask requires the signal be attenuated a minimum of 20 dB from its peak amplitude at ±11 MHz from the centre frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

Since rel-8, 3GPP has standardized access network discovery and selection functions (ANDSF), which is for interworking between 3GPP access network and non-3GPP access network (e.g. WLAN). The ANDSF is elaborated in 3GPP TS 24.312. The ANDSF management object (MO) is used to manage inter-system mobility policy (ISMP) and inter-system routing policy (ISRP) as well as access network discovery information stored in a UE supporting provisioning of such information from an ANDSF. The ANDSF may initiate the provision of information from the ANDSF to the UE. The UE may initiate the provision of all available information from the ANDSF, using a client-initiated session alert message. The relation between ISMP, ISRP and discovery information is that ISMP prioritize the access network when the UE is not capable to connect to the EPC through multiple accesses, ISRP indicate how to distribute traffic among available accesses when the UE is capable to connect to the EPC through multiple accesses (i.e. the UE is configured for IP flow mobility (IFOM), multiple access connectivity (MAP-CON), non-seamless WLAN offload or any combination of these capabilities), while discovery information provide further information for the UE to access the access network defined in the ISMP or in the ISRP. The MO defines validity areas, position of the UE and availability of access networks in terms of geographical coordinates. The UE is not required to switch on all UE's supported radios for deducing its location for ANDSF purposes or for evaluating the validity area condition of a policy or discovery information. The UE shall discard any node which is a child of the ANDSF MO root node and is not supported by the UE. The ANDSF server shall discard any node which is a child of the ANDSF MO root node and is not supported by the ANDSF server.

In addition to ANDSF, additional policy may be specified in RAN specification for interworking between 3GPP access network and non-3GPP access network (e.g. WLAN). The additional policy for interworking between 3GPP access network and non-3GPP access network may be referred to as RAN rules. The RAN rule may indicate condition(s) in which the UE is allowed/required to perform traffic steering from 3GPP LTE to WLAN or vice versa. The condition may involve evaluation of measurement results of 3GPP LTE cell, where the measurement result is compared with a relevant RAN rule parameter (i.e., measurement threshold) included in the RAN assistance information. The condition may also involve evaluation of measurement results of WLAN, where the measurement result is compared with a relevant RAN rule parameter (i.e., measurement threshold) indicated by the RAN assistance information.

For ANDSF and RAN rule, the following RAN assistance parameters (or information) may be provided by the RAN and used by the RAN rules and the ANDSF. The RAN assistance information may be provided to the UE in SystemInformation-BlockType17 or in the RRCConnectionReconfiguration message. The RAN assistance information received in SystemInformationBlockType17 is valid only if the UE is camped on a suitable cell. The following RAN assistance parameters provided by the RAN may replace corresponding parameters in ANDSF and RAN rule.

LTE reference signal received power (RSRP)/UMTS common pilot channel (CPICH) received signal code power (RSCP) threshold (for frequency division duplex (FDD))/UMTS primary common control physical channel (PCCPCH) RSCP threshold (for time division duplex (TDD))

LTE reference signal received quality (RSRQ)/UMTS CPICH Ec/No threshold (for FDD)

WLAN channel utilization in the basic service set (BSS) load IE (MaximumBSSLoadValue) threshold (the parameter is used 1-way for determining offload possibility from 3GPP to WLAN or alternatively hysteresis is used to prevent ping-pong)

Available WLAN DL and UL backhaul data rate (MinBackhaulThreshold) threshold (the parameter is used 1-way for determining offload possibility from 3GPP to WLAN or hysteresis is used to prevent ping-pong)

Further, offload preference indicator (OPI) may be provided by the RAN and used by the ANDSF. The OPI value provided by the RAN is compared to a comparison-value provided in the ANDSF policy using an "equal to"-comparison (e.g. OPI_pointer=OPI value) or a "greater/less than"-comparison (e.g. OPI_threshold≥OPI_value) or may be compared to a bitmap (e.g. a set of allowed OPI values) to trigger specific actions, e.g.:

1. OPI may be used in ANDSF to differentiate subscriber subgroups, i.e. gold/silver/bronze. For instance, different subscriber subgroups may have different OPI thresholds/pointers in their ANDSF policies, so that bronze users are offloaded to WLAN first (when cellular load slightly increases) and gold users are kept on LTE till LTE capacity allows so.

2. OPI may be used to differentiate between traffic types, e.g. ANDSF ISRP policies for different IP flows may have different OPI thresholds/pointers so that best effort traffic is offloaded to WLAN first (when cellular load slightly increases).

3. OPI may also be used to trigger specific parts of ANDSF policies and/or ANDSF Mos, OPI may be signaled to the UE in the form of a bitmap which may be compared to a bitmap (e.g. a set of allowed OPI values) stored in the ANDSF to trigger specific parts of ANDSF policies and/or ANDSF Mos. In this case, OPI value may be considered as kind of ANDSF MO index if there are multiple ANDSF Mos.

Examples and clarifications regarding RAN assistance parameters usage in RAN rules and ANDSF are described below. For each parameter "xxx", there may be two thresholds indicated by the RAN, i.e. "thresXxxLow" for lower threshold, and "thresXxxHigh" for higher threshold.

For 3GPP LTE, the RAN assistance parameters may be used for traffic steering between 3GPP/WLAN as follows. The UE shall move traffic (e.g. for offloadable access point name (APN)) from 3GPP to WLAN if all the following conditions are fulfilled if corresponding parameters are broadcast or send with dedicated signaling:

Rsrp<threshRsrpLow or Rsrq<threshRsrqLow
bssLoad<threshBssLoadLow
dlBackhaulRate>threshDlBackhaulRateHigh
ulBackhaulRate>threshUlBackhaulRateHigh The UE shall move offloadable traffic from WLAN to 3GPP if one or more of the following conditions is fulfilled if corresponding parameters are broadcast or send with dedicated signaling:

Rsrp>threshRsrpHigh
Rsrq>threshRsrqHigh

For 3GPP UMTS, the RAN assistance parameters may be used for traffic steering between 3GPP/WLAN as follows. The UE shall move traffic (e.g. for offloadable APN) from 3GPP to WLAN if all the following conditions are fulfilled if corresponding parameters are broadcast or send with dedicated signaling:

Rscp<threshRscpLow or EcNo<threshEcNoLow
bssLoad<threshBssLoadLow
dlBackhaulRate>threshDlBackhaulRateHigh
ulBackhaulRate>threshUlBackhaulRateHigh The UE shall move offloadable traffic from WLAN to 3GPP if one or more of the following conditions is fulfilled if corresponding parameters are broadcast or send with dedicated signaling:

Rscp>threshRscpHigh
EcNo>threshEcNoHigh

FIG. 7 shows an example of a method for providing RAN assistance information for roaming UEs. There is no consideration for roaming UEs for providing the RAN assistance information currently. That is, regardless of whether the UE is in roaming state or not, the UE utilizes the common RAN assistance information for ANDSF and/or RAN rule. Referring to FIG. 7, PLMN1 is the PLMN of the current cell providing the RAN assistance information. Non-roaming UE is the UE that PLMN1 is included in the home PLMN (HPLMN) or equivalent HPLMN (EHPLMN) of the UE, while roaming UE is the UE that PLMN1 is not included in the (E)HPLMN of the UE. The roaming UEs as well as non-roaming UEs use the RAN assistance information #1 commonly.

However, when the operator is eager to offload the traffic in its network due to the congestion, the network may firstly offload roaming UEs in order to provide high quality of service to UEs in (E)HPLMN. This may cause discrimination against roaming UEs.

In order to solve the problem described above, the RAN assistance information needs to be provided separately for roaming UEs and for non-roaming UEs. Hereinafter, a method for handling RAN assistance information for roaming UEs according to an embodiment of the present invention is described. The non-roaming UE refers to the UE whose currently registered PLMN is included in (E)HPLMN of the UE. The roaming UE refers to the UE whose currently registered PLMN is not included in (E)HPLMN of the UE. According to an embodiment of the present invention, the RAN assistance information for roaming UEs and the RAN assistance information for non-roaming UEs can be differentiated.

FIG. 8 shows an example of a method for handling RAN assistance information according to an embodiment of the present invention.

In step S100, the UE receives first RAN assistance information for roaming UEs and second RAN assistance information for non-roaming UEs. That is, for roaming UEs and non-roaming UEs, the network may provide multiple sets of RAN assistance information which includes threshold values for UEs in each PLMN for ANDSF and/or RAN rules. Alternatively, for non-roaming UEs, the network may provide a set of RAN assistance information which includes threshold values for (E)HPLMN. And for roaming UEs, instead of providing new threshold values via the RAN assistance information, the network may provide multiple sets of offset values, which are compared with and applied to each of the threshold values for non-roaming UEs, for roaming UEs in the RAN assistance information via dedicated and/or broadcast signaling.

The RAN assistance information for roaming UEs and non-roaming UEs may be provided from different PLMNs by various methods described below. In the following, (E)HPLMN is the PLMN of the current cell of the UE providing the RAN assistance information. Non-roaming UE is the UE that the HPLMN is included in (E)HPLMN of the UE, while roaming UE is the UE that the HPLMN is not included in (E)HPLMN of the UE. The UE whose (E)HPLMN is VPLMN1, VPLMN2 and VPLMN3 is the roaming UE.

FIG. 9 shows an example of configuration of RAN assistance information according to an embodiment of the present invention. Referring to FIG. 9, two sets of RAN assistance information are provided, where one set (i.e. RAN assistance information #1) for non-roaming UEs and another set (i.e. RAN assistance information #2) for roaming UEs. The set of RAN assistance information for roaming UEs (i.e. RAN assistance information #2) may be provided commonly for all roaming UEs.

FIG. 10 shows another example of configuration of RAN assistance information according to an embodiment of the present invention. Referring to FIG. 10, four sets of RAN assistance information are provided, where first set (i.e. RAN assistance information #1) for non-roaming UEs, second set (i.e. RAN assistance information #2) for roaming UEs in VPLMN1, third set (i.e. RAN assistance information #3) for roaming UEs in VPLMN2, and fourth set (i.e. RAN assistance information #4) for roaming UEs in VPLMN3. That is, separate set of RAN assistance information applicable for an associated PLMN may be provided to UE. In this association, the RAN assistance information and each PLMN, other than (E)HPLMN, has 1:1 mapping (association) such that each PLMN is associated with a separate (different) set of RAN assistance information.

FIG. 11 shows another example of configuration of RAN assistance information according to an embodiment of the present invention. Referring to FIG. 11, three sets of RAN assistance information are provided, where first set (i.e. RAN assistance information #1) for non-roaming UEs, second set (i.e. RAN assistance information #2) for roaming UEs in VPLMN1, third set (i.e. RAN assistance information #3) for roaming UEs in VPLMN2 and VPLMN3. That is, some set of RAN assistance information for the associated PMLN may be provided separately, while some set of RAN assistance information for multiple PLMNs may be provided commonly. That is, the embodiment shown in FIG. 11 may correspond to the combination of the embodiment shown in FIG. 9 and FIG. 10. In this association, the RAN assistance information and each PLMNs, other than (E)HPLMN, has N:1 mapping (association) such that multiple different PLMNs can be associated with each separate (different) set of RAN assistance information or common set of RAN assistance information.

The association between RAN assistance information and PLMN, other than (E)HPLMN, may be defined explicitly. For example, for each set of RAN assistance information, the PLMN identifier associated with the RAN assistance information may be explicitly provided via the RAN assistance information. The UEs in the PLMN, indicated by the PLMN identifier, may utilize the RAN assistance information associated to the indicated PLMN. Table 1 shows an example of explicit indication of the association between RAN assistance information and PLMN.

TABLE 1

| RAN assistance information | (E)HPLMN of the UE who applies the corresponding RAN assistance information |
|---|---|
| RAN assistance information #1 | PLMN1 |
| RAN assistance information #2 | PLMN2 |
| RAN assistance information #3 | PLMN3, PLMN4 |
| RAN assistance information #4 | PLMN5 |

Referring to Table 1, RAN assistance information #1 is associated with PLMN1, RAN assistance information #2 is associated with PLMN2, RAN assistance information #3 is associated with PLMN3 and PLMN4, and RAN assistance information #4 is associated with PLMN5. This association may be explicitly indicated by the PLMN identifier corresponding to each PLMN.

Alternatively, the association between RAN assistance information and PLMN, other than (E)HPLMN, may be defined implicitly. The UEs in the PLMN not explicitly associated with the RAN assistance information, e.g. by the PLMN identifier as described above, may consider that the common RAN assistance information is applied. Table 2 shows an example of implicit indication of the association between RAN assistance information and PLMN.

TABLE 2

| RAN assistance information | (E)HPLMN of the UE who applies the corresponding RAN assistance information |
|---|---|
| RAN assistance information #1 | PLMN1 |
| RAN assistance information #2 | PLMN2 |
| RAN assistance information #3 | |

Referring to Table 1, RAN assistance information #1 is associated with PLMN1, and RAN assistance information #2 is associated with PLMN2. For RAN assistance information #3, there is no explicit association with PLMN. In this case, RAN assistance information #3 may be considered as common RAN assistance information associated with PLMNs other than PLMN1 and PLMN2. That is, the UE, of which (E)HPLMN is the PLMN other than PLMN1 and PLMN2, may apply RAN assistance information #3 autonomously.

The RAN assistance information may be signaled by the RAN via dedicated signaling and/or broadcast signaling and is used by ANDSF and/or RAN rules. The RAN assistance information may include the following at least one parameter:

LTE RSRP/UMTS CPICH RSCP threshold (for FDD)/ UMTS PCCPCH RSCP threshold (for TDD)
LTE RSRQ/UMTS CPICH Ec/No threshold (for FDD)
WLAN channel utilization in the BSS load IE (MaximumBSSLoadValue) threshold (the parameter is used 1-way for determining offload possibility from 3GPP to WLAN or alternatively hysteresis is used to prevent ping-pong)
Available WLAN DL and UL backhaul data rate (MinBackhaulThreshold) threshold (the parameter is used 1-way for determining offload possibility from 3GPP to WLAN or hysteresis is used to prevent ping-pong)
WLAN signal level threshold
Offload preference indicator
Offloadable(or not offloadable) APN information (or evolved packet system (EPS) bearer information)
Offloadable WLAN identifiers Back to FIG. 8, in step S110, the UE determines whether the UE is in the HPLMN or VPLMN. Specifically, the UE may determine that the UE is in VPLMN (i.e. in roaming area) if the (E)HPLMN of the UE is not in the broadcasted PLMN list of the cell.

In step S120, the UE applies one of the first RAN assistance information or second RAN assistance information according to the determination. That is, if it is determined that the UE is in VPLMN, the UE applies the first RAN assistance information for roaming UEs. If it is determined that the UE is in (E)HPLMN, the UE applies the second RAN assistance information for non-roaming UEs. If the first RAN assistance information includes the new threshold values for roaming UEs, the UE may apply the new thresholds values for roaming UEs for ANDSF and/or RAN rules. If the first RAN assistance information includes offset values, associated with each PLMN other than (E)HPLMN, for roaming UEs, the UE may manipulate (e.g. add/subtract/multiply/divide) the threshold values for non-roaming UEs in the RAN assistance information with the offset values associated with the PLMN to which the UE belongs and apply the manipulated threshold values for roaming UEs for ANDSF and/or RAN rule.

If one cell is shared by multiple PLMNs (i.e. by RAN sharing), each PLMN may provide separate set of the RAN assistance information for roaming UEs which are registered in each PLMN. Table 3 shows an example of association between RAN assistance information and PLMN if one cell is shared by multiple PLMNs.

TABLE 3

| Registered PLMN at a camping cell | (E)HPLMN of the UE | RAN assistance information |
|---|---|---|
| PLMN1 | PLMN1 | RAN assistance information #1 |
| PLMN1 | PLMN other than PLMN1 | RAN assistance information #2 |
| PLMN1-2 | PLMN1-2 | RAN assistance information #3 |
| PLMN1-2 | PLMN other than PLMN1-2 | RAN assistance information #2 |

Referring to Table 3, a cell is shared by PLMN1 and PLMN1-2. For PLMN1, the cell provides RAN assistance information #1 for the UE having PLMN1 as (E)HPLMN and RAN assistance information #2 for the UE not having PLMN1 as (E)HPLMN. For PLMN1-2, the cell provides RAN assistance information #3 for the UE having PLMN1-2 as (E)HPLMN and RAN assistance information #2 for the UE not having PLMN1-2 as (E)HPLMN.

Further, if a PLMN selection is performed on request by NAS, the UE may discard stored dedicated RAN assistance information even if the relevant validity timer is running Alternatively, if a PLMN selection is performed on request by NAS and the UE finds itself in PLMN other than (E)HPLMN (e.g. VPLMN), the UE may discard stored dedicated RAN assistance information received from (E)HPLMN even if the relevant validity timer is running FIG. 12 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for handling, by a user equipment (UE), radio access network (RAN) assistance information in a wireless communication system, the method comprising:
   receiving, by the UE, first RAN assistance information including a first threshold value which is used for traffic steering of a non-roaming UE;
   receiving, by the UE, offset values for a roaming UE, wherein each of the offset values is associated with each of visited public land mobile networks (VPLMNs);
   determining, by the UE, whether the UE is the roaming UE or the non-roaming UE;
   when the UE is determined to be the roaming UE:
      manipulating the first threshold value included in the received first RAN assistance information, by using a certain offset value among the received offset values,
      wherein the certain offset value is an offset value associated with a home PLMN (HPLMN) or an equivalent HPLMN (EHPLMN) of the roaming UE, and
      applying the manipulated first threshold value for traffic steering of the roaming UE; and
   when the UE is determined to be the non-roaming UE, applying the first threshold value included in the received first RAN assistance information for traffic steering of the non-roaming UE.

2. The method of claim 1, further comprising:
   receiving, by the UE, second RAN assistance information including a second threshold value which is used for traffic steering of the roaming UE.

3. The method of claim 2, further comprising:
   when the UE is determined to be the roaming UE, applying the second threshold value included in the received second RAN assistance information for traffic steering of the roaming UE.

4. The method of claim 1, wherein traffic steering is performed between a 3rd generation partnership project (3GPP) access network and a non-3GPP access network.

5. The method of claim 2, wherein the second RAN assistance information is associated with one VPLMN or a plurality of VPLMNs.

6. The method of claim 5, wherein an association between the second RAN assistance information and the one VPLMN is indicated by a PLMN identifier included in the second RAN assistance information.

7. The method of claim 1, wherein the roaming UE is a UE of which a registered PLMN is not included in the HPLMN or the EHPLMN of the UE, and
   wherein the non-roaming UE is a UE of which the registered PLMN is included in the HPLMN or the EHPLMN of the UE.

8. The method of claim 1, wherein the first threshold value is at least one of a wireless local area network (WLAN) channel utilization threshold, an available downlink (DL) and uplink (UL) backhaul data rate threshold or a WLAN signal level threshold.

9. The method of claim 1, wherein different offset values are associated with different VPLMNs, respectively.

10. The method of claim 2, wherein the first RAN assistance information and the second RAN assistance information further include at least one of a reference signal received power (RSRP), a reference signal received quality (RSRQ), an offload preference indicator, or offloadable access point name (APN) information.

11. The method of claim 1, further comprising:
    receiving, by the UE and from a cell, a PLMN list of the cell to which the UE belongs,
    wherein the UE is determined to be the roaming UE when the HPLMN or the EHPLMN of the UE is not included in the PLMN list of the cell, and
    wherein the UE is determined to be the non-roaming UE when the HPLMN or the EHPLMN of the UE is included in the PLMN list of the cell.

12. The method of claim 3, wherein the applying the second threshold value comprises using the second threshold value for the roaming UE at least for an access network discovery and selection function (ANDSF) or RAN rules.

13. The method of claim 1, wherein the applying the first threshold value comprises using the first threshold value for the non-roaming UE at least for an access network discovery and selection function (ANDSF) or RAN rules, and
    wherein the applying the manipulated first threshold value comprises using the manipulated first threshold value for the roaming UE at least for the ANDSF or the RAN rules.

14. The method of claim 1, further comprising:
    discarding the first threshold value while a timer is running if a PLMN selection is performed on request by a non-access stratum (NAS).

15. A user equipment (UE) configured to handle radio access network (RAN) assistance information in a wireless communication system, the UE comprising:
    a memory;
    a transceiver; and
    a processor, connected to the memory and the transceiver, that:
      controls the transceiver to receive first RAN assistance information including a first threshold value which is used for traffic steering of a non-roaming UE,
      controls the transceiver to receive offset values for a roaming UE,
      wherein each of the offset values is associated with each of visited public land mobile networks (VPLMNs),
      determines whether the UE is the roaming UE or the non-roaming UE,
      when the UE is determined to be the roaming UE:

manipulates the first threshold value included in the received first RAN assistance information, by using a certain offset value among the received offset values, wherein the certain offset value is an offset value associated with a home PLMN (HPLMN) or an equivalent HPLMN (EHPLMN) of the roaming UE, and applies the manipulated first threshold value for traffic steering of the roaming UE, and when the UE is determined to be the non-roaming UE, applies the first threshold value included in the received first RAN assistance information for traffic steering of the non-roaming UE.

* * * * *